Figure 1:
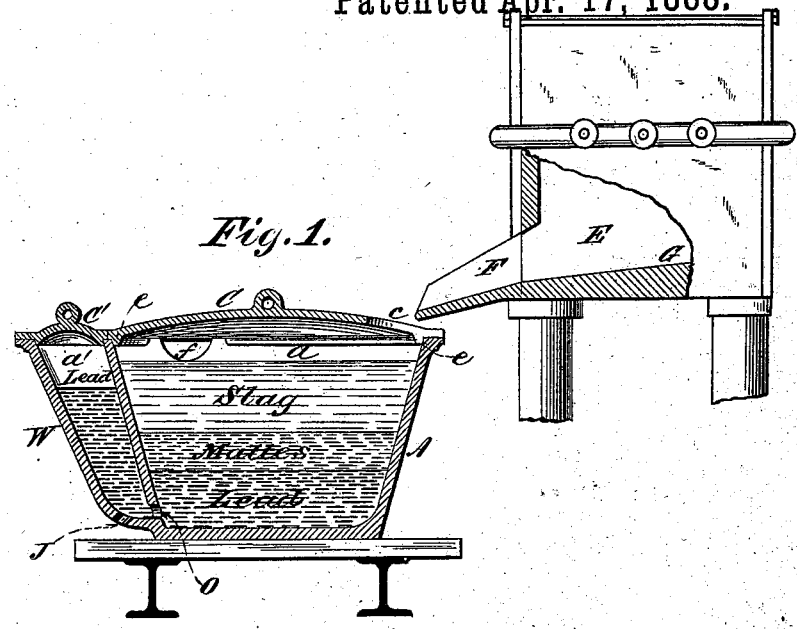

(No Model.)

W. B. DEVEREUX.
APPARATUS FOR SEPARATING LEAD OR BASE BULLION IN SMELTING FROM SLAG, MATTES, AND SPEISS.

No. 381,118. Patented Apr. 17, 1888.

Witnesses:
Geo. W. Miatt
Wm Gardner

Inventor:
Walter B. Devereux.
By his Attorney
Willard Parker Butler

UNITED STATES PATENT OFFICE.

WALTER B. DEVEREUX, OF ASPEN, COLORADO.

APPARATUS FOR SEPARATING LEAD OR BASE BULLION IN SMELTING FROM SLAG, MATTES, AND SPEISS.

SPECIFICATION forming part of Letters Patent No. 381,118, dated April 17, 1888.

Application filed February 24, 1886. Serial No. 193,067. (No model.)

*To all whom it may concern:*

Be it known that I, WALTER B. DEVEREUX, a citizen of the United States, and a resident of Aspen, in the county of Pitkin and State of Colorado, have invented certain new and useful Improvements in Apparatus for Separating Lead or Base Bullion in Smelting from Slags, Mattes, and Speiss, of which the following is a specification.

My invention relates to the separation of lead and the alloys of silver, gold, and other metals with lead, commonly known as "base bullion," from the mattes, slags, and speisses which are formed therewith in the smelting of ores of such metals; and the object of the same is to effect the said separation, outside of the furnace, in one and the same operation, while the materials to be separated are still in molten condition, and while the furnace is still running, in a more convenient manner than has heretofore been possible.

It has heretofore been the practice in smelting silver and lead ores to make use of a furnace having an interior hearth or crucible, into which the bullion, mattes, speiss, and slag fall and settle after reduction, and to use in connection therewith some one of the many forms of devices which are in common use for separating out and removing the base bullion from the crucible while the same is still liquid, and for tapping off the mattes and slags from the furnace, either together or separately. The most usual method of tapping off the base bullion is to connect the furnace-hearth with an exterior basin, in which the molten base bullion or lead gradually rises, by reason of the static pressure of the column of liquid material in the crucible of the furnace, and from which the base bullion is removed as it accumulates by means of a ladle. The automatic or so-called "siphon" furnace-tap is the form of a device chiefly in use throughout the western portion of the United States, and is merely a modified form of the old-fashioned exterior basin, and is too well known to require description in this connection.

All of the various methods heretofore made use of for tapping off bullion from furnaces are open in practice to very many and serious objections. The principal objection is that in cases where the ores to be smelted contain copper, zinc, baryta, or other impurities, accretions are liable to be formed in the furnace crucible, the formation of which is extremely difficult to prevent, and the growth of which almost invariably causes an eventual stoppage of the furnace before it would otherwise be necessary, owing to the stoppage and chilling of the lead-well and the difficulty of keeping the passage open through the walls of the furnace-hearth. The accretions, which are usually hard tough masses, have to be removed by chiseling, necessitating the furnace being put out of blast and cooled off.

Now, I have discovered that by constructing a smelting-furnace in such a manner as to entirely do away with the ordinary form of crucible, and by tapping the entire fluid contents of the furnace directly into an exterior and removable receptacle provided with exterior means for separating the lead or bullion from the mattes and slags, I am able to effect a much more convenient and economical separation of base bullion or lead from the mattes, speiss, and slags than has heretofore been possible, and also to prevent the formation of accretions, and at the same time to effect great economy in furnace construction and much more favorable results in smelting ores, by reason of the greater regularity in working, and consequently to produce campaigns of much greater length.

My invention, which consists in an apparatus in which the said separation is conducted, will be best understood by reference to the accompanying drawings, in which—

Figure 2:
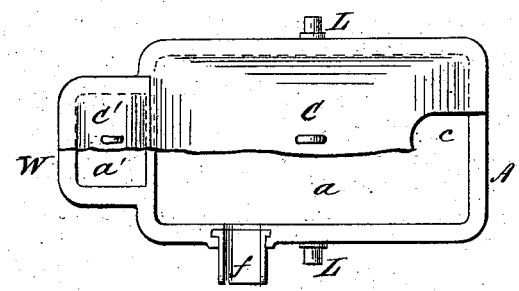
Figure 4:
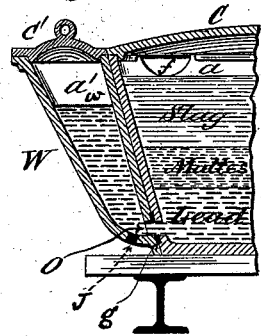
Figure 3:
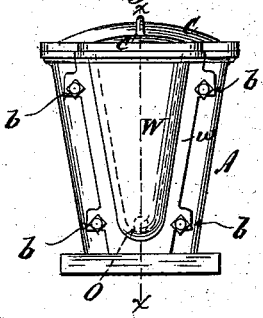

Figure 1 is a vertical elevation of the apparatus; Fig. 2, a plan view of the same, and Figs. 3 and 4 are respectively an elevation and a vertical section on the line *x x* of Fig. 3 of a modified form.

Similar letters refer to similar parts throughout the several views.

In all of the views, E represents an ordinary shaft-furnace, in which the crucible is entirely eliminated and the bottom G made slightly inclined from all points toward the point at which the spout of the furnace is usually placed.

F represents the ordinary form of furnace tap-hole or spout, through which the entire smelted portion of the charge is drawn off. The vessel which, in my invention, is substituted for the crucible consists of a receiver or well, A, which is made of metal—preferably of cast-iron—of any convenient size or shape. In practice this receiver will be either circular or rectangular, with the corners rounded, as shown in the views. In each case the side walls are made to flare slightly outward from the bottom toward the top, in order to facilitate dumping. The upper rim of the receiver is provided with an ordinary discharge-spout, $f$, of any convenient size or shape. This spout may be cast in one piece with the vessel or be made detachable and fastened thereto in any convenient manner.

The separation of the lead or base bullion from the mattes, slags, and spiess is effected by means of an exterior lead-well, W, cast in one piece with or cast separate and attached in any convenient manner to the exterior wall of the receiver A. In Figs. 1 and 2 of the views this lead-well is made in the form of a truncated cone or cylinder and is cast in one solid piece with the receiving-well A. In practice it will probably be found advisable to make the same detachable from the receiver, so that it may be more readily cleaned out. An opening, O, in the bottom of the side wall of the receiver opposite to the lead-well serves to connect the exterior lead-well, W, with the interior of the receiver A. The receiver is covered with a flanged cover, C, of iron or other metal, which fits tightly over the same, as shown, being held in apposition by means of the exterior flange, $e$. The lead-well W is likewise covered with any suitable form of cover, C', preferably with one of the character shown in the views provided with an exterior flange for holding it in position. The receiver A is provided with a lug, L L, on each side cast in one solid piece therewith or bolted thereto, whereby it may be lifted upon a crane and transported to any desired point and there dumped. In order to facilitate drawing off the lead, when the vessel for any reason becomes choked up with shells, an opening, J, is provided in the bottom of the vessel, which may be filled up with fire-clay or by means of an iron plug while the vessel is being run.

Figs. 3 and 4 show a method of attaching the lead-well W when the same is made removable from the receiver A, as is in certain cases desirable. As is there shown, the well W is provided with a flanged back, $w$, of the shape shown, through which it is fastened to the end wall of the receiver by the screw-bolts $b\ b\ b\ b$, Fig. 3, passing through ears in the back. An opening, O, as before, connects the interior of the lead-well W with the interior of the receiver A, and the connection may be made tight by means of a gasket, $g$, Fig. 4, inserted in annular grooves planed on the flat surfaces around the opening O. The movable lead-well, like the stationary one, may be provided with the opening J at its base, as above set forth, and both the receiver and the lead-well are provided with the flanged covers C and C', as before.

The method of separation effected by the form of apparatus shown in the drawings and the mode of operation of the same are as follows: In smelting lead ores, as is well known, the various products and by-products of the furnace differ in specific gravity. The lead or base bullion as it issues from the furnace is slightly heavier than the mattes, speiss, and slags which flow out with the same, and will consequently settle to the bottom of any vessel in which all of the furnace products are collected while they are still molten, allowing the mattes, speiss, and slag to float on top of the lead. Where the entire contents of the furnace-crucible is tapped into a vessel of the character shown, having connected therewith an exterior compartment by means of an opening at its base, the lead, as it settles into the bottom of the receiver A, will flow over through the opening between the two compartments into the exterior compartment in proportion as the static pressure in the first compartment increases. The slags, mattes, and speiss being but little lighter than the lead in bullion, will keep the static pressure between the column of liquid in the receiver and that in the exterior well almost constant, the excess of slag, &c., flowing off through the spout $f$, and when the furnace is continuously tapped into a receiver of this character, there will be a constantly-running stream of slag, &c., at the spout $f$, and a constantly-rising column of lead or bullion in the lead-well W. The chamber $a'$ of the lead-well is emptied by dipping out the base bullion by means of a ladle, or in any other convenient manner. The mattes, speiss, and slags as they flow off from the spout $f$ may be caught in any convenient form of vessel, and subjected to any desirable method of separation.

The great advantage of the form of apparatus for separating here shown and described consists in the movability of the collecting-vessel, which enables it to be easily manipulated and dumped. The efficiency may be still further increased by making the lead-well detachable at pleasure from the receiver and by substituting therefor a larger or a smaller well, according to the amount of bullion or lead running from the furnace.

I am aware that attempts have been made to separate slags and mattes from bullion or lead by means of stationary appliances, such as the automatic and so-called "siphon" tap, above referred to, attached to the furnace-crucible, and also by means of a stationary lead-well placed outside of the furnace; and I am aware that it is old to smelt lead ores in a furnace without a crucible, as this has heretofore been done by Herreshoff and others, and to tap from a furnace into a movable receiving-well containing in its side walls openings for the purpose of effecting a separation of the materials contained therein; but I am unaware that any attempt has been made to combine either removable or fixed devices for separating with a movable collecting-vessel, used in combination with a furnace in which the crucible is eliminated; and I believe it is new to smelt in a furnace having no crucible proper, and to tap continuously into a removable receiving-well provided exteriorly with a separate lead-well, permits of the lead being separated from the smelted mass outside of the furnace in a removable receptacle which may be removed and replaced at pleasure. As I have heretofore, upon the 25th day of February, 1886, filed various applications for Letters Patent for apparatus for separating similar substances, in which applications certain agencies are described which may or may not be the same as those described in the present case, I therefore disclaim the various combinations in the claims of said application contained so far as the present Letters Patent are concerned; and hence

I claim as my invention—

1. The combination, substantially as hereinbefore described, with a smelting-furnace having no crucible proper, of a portable receiver or collecting-well, receiving the discharge from said furnace, and an exterior chamber or well connected with the interior of said vessel at the bottom, whereby the heavier portion of the material tapped from said furnace into the receiver flows through said opening and fills said exterior chamber in proportion as the static pressure in the receiving-vessel increases.

2. The combination, substantially as hereinbefore described, with a smelting-furnace having the crucible eliminated, of a portable receiver or collecting-well for receiving the discharge from said furnace, and an exterior chamber or well connected with the interior of said vessel at the bottom, whereby the heavier portion of the material tapped from said furnace into said receiver flows through said opening and fills said exterior chamber in proportion as the static pressure in the receiving-vessel increases.

3. The combination, substantially as hereinbefore described, with a smelting-furnace having no crucible proper, of a portable receiver or collecting-well for receiving the discharge from said furnace, an exterior chamber or well so constructed and arranged that it may be detached from the receiver, and an opening in the bottom of the side wall of said receiving-vessel, connecting the interior of said vessel with said removably-attached exterior chamber, whereby the heavier portion of the material tapped from said furnace into said receiver flows through said opening and fills said chamber in proportion as the static pressure in the receiving-vessel increases.

4. The combination, substantially as hereinbefore described, with a smelting-furnace having no crucible proper, of a portable receiver or collecting-vessel into which said furnace discharges, an exterior chamber or well so constructed and arranged that it may be detached from the receiver, means for attaching said exterior well to said receiver, substantially as described, an opening in the side walls of the receiver connecting the interior of the same at the bottom with the bottom of said exterior chamber, and means for covering said receiver and exterior chamber, substantially as described.

Signed at New York, in the county of New York and State of New York, this 15th day of February, A. D. 1886.

WALTER B. DEVEREUX.

Witnesses:
EDWIN T. RICE, Jr.,
WILLARD P. BUTLER.